United States Patent
Schumacher et al.

(10) Patent No.: US 7,684,278 B1
(45) Date of Patent: Mar. 23, 2010

(54) METHOD AND APPARATUS FOR IMPLEMENTING FIFOS USING TIME-MULTIPLEXED MEMORY IN AN INTEGRATED CIRCUIT

(75) Inventors: Paul R. Schumacher, Berthoud, CO (US); Mark Paluszkiewicz, Schaumburg, IL (US); Kornelis A. Vissers, Sunnyvale, CA (US)

(73) Assignee: XILINX, Inc., San Jose, CA (US)

( * ) Notice: Subject to any disclaimer, the term of this patent is extended or adjusted under 35 U.S.C. 154(b) by 0 days.

(21) Appl. No.: 12/198,733

(22) Filed: Aug. 26, 2008

(51) Int. Cl.
G11C 8/00 (2006.01)
(52) U.S. Cl. ............... 365/230.02; 365/230.03; 365/230.05; 326/38; 326/41; 326/46; 326/47; 711/147; 711/202
(58) Field of Classification Search .......... 326/37–41, 326/46–47; 365/230.02, 230.03, 230.05; 711/147, 202
See application file for complete search history.

(56) References Cited

U.S. PATENT DOCUMENTS 5,179,680 A * 1/1993 Colwell et al. ............. 711/125
5,664,116 A * 9/1997 Gaytan et al. ............... 709/234
6,067,298 A    5/2000 Shinohara
6,275,920 B1 * 8/2001 Abercrombie et al. ........ 712/14
7,038,952 B1 * 5/2006 Zack et al. ............. 365/189.15
7,260,688 B1 * 8/2007 Baxter et al. ................ 711/147
7,489,259 B2 * 2/2009 Savell ......................... 341/61
7,594,047 B2 * 9/2009 Luk ........................... 710/52
2008/0031129 A1 2/2008 Arseneault et al.

OTHER PUBLICATIONS

U.S. Appl. No. 11/880,160, filed Jul. 19, 2007, Neuendorffer.

* cited by examiner

*Primary Examiner*—Vibol Tan
*Assistant Examiner*—Jason Crawford
(74) *Attorney, Agent, or Firm*—Robert M. Brush

(57) ABSTRACT

Method and apparatus for implementing first-in-first-out (FIFO) memories using time-multiplexed memory in an integrated circuit are described. A block random access memory (BRAM) circuit embedded in the integrated circuit is provided. The BRAM includes at least one port responsive to a respective at least one BRAM clock signal. FIFO logic is configured to implement a plurality of FIFOs in the BRAM having a plurality of interfaces. Multiplexer logic is configured to selectively couple the plurality of output interfaces of the FIFO logic to the at least one port of the BRAM circuit responsive to at least one FIFO clock signal. Each of the at least one BRAM clock signal has at least twice the frequency of a respective one of the at least one FIFO clock signal.

20 Claims, 4 Drawing Sheets

METHOD AND APPARATUS FOR IMPLEMENTING FIFOS USING TIME-MULTIPLEXED MEMORY IN AN INTEGRATED CIRCUIT

FIELD OF THE INVENTION

One or more aspects of the present invention relate generally to integrated circuits and, more particularly, to a method and apparatus for implementing first-in-first-out (FIFO) memories using time-multiplexed memory in an integrated circuit.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs), programmable input/output blocks (IOBs), and like type programmable elements. The CLBs and IOBs are interconnected by a programmable interconnect structure. An FPGA may also include various dedicated logic circuits, such as memories, digital clock managers (DCMs), and input/output (I/O) transceivers. Notably, an FPGA may include one or more embedded processors. The programmable logic of an FPGA (e.g., CLBs, IOBs, and interconnect structure) is typically programmed by loading a stream of configuration data (known as a bitstream) into internal configuration memory cells. The bitstream is typically stored in an external nonvolatile memory, such as an erasable programmable read only memory (EPROM). The states of the configuration memory cells define how the CLBs, IOBs, interconnect structure, and other programmable logic are configured.

In particular, present FPGAs include block random access memory (BRAM) integrated into the programmable fabric. BRAMs may be dual-ported, allowing two write ports and two read ports with access to the same block of memory in any given clock cycle. The size of each BRAM typically targets the mid-range of memories used in most applications. For example, VIRTEX-5 FPGAs commercially available from Xilinx, Inc. of San Jose, Calif. include 36 kilobit (kbit) BRAMs.

Some applications, however, require either smaller memory blocks that the provided BRAMs and/or the flexibility of more than two ports per BRAM. For example, some applications may require the use of multiple first-in-first-out (FIFO) memories. Some or all of these FIFO memories may be designed to have sizes smaller than the size of the BRAMs in a target device. When a design having FIFO memories is implemented for a target FPGA device, the implementation may use a BRAM for each FIFO. Such implementation results in inefficient use of resources in the FPGA.

Accordingly, there exists a need in the art for more efficient use of on-chip block memories in an integrated circuit, such as an FPGA, to implement applications having FIFO memories.

SUMMARY OF THE INVENTION

A method and apparatus for implementing first-in-first-out (FIFO) memories using time-multiplexed memory in an integrated circuit are described. An aspect of the invention relates to providing first in first out (FIFO) memories in an integrated circuit. A block random access memory (BRAM) circuit is embedded in the integrated circuit. The BRAM circuit includes at least one port responsive to a respective at least one BRAM clock signal. FIFO logic is configured to implement a plurality of FIFOs in the BRAM circuit, the FIFO logic having a plurality of output interfaces. Multiplexer logic is configured to selectively couple the plurality of output interfaces of the FIFO logic to the at least one port of the BRAM circuit responsive to at least one FIFO clock signal. Each of the at least one BRAM clock signal has at least twice the frequency of a respective one of the at least one FIFO clock signal.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

Figure 1:
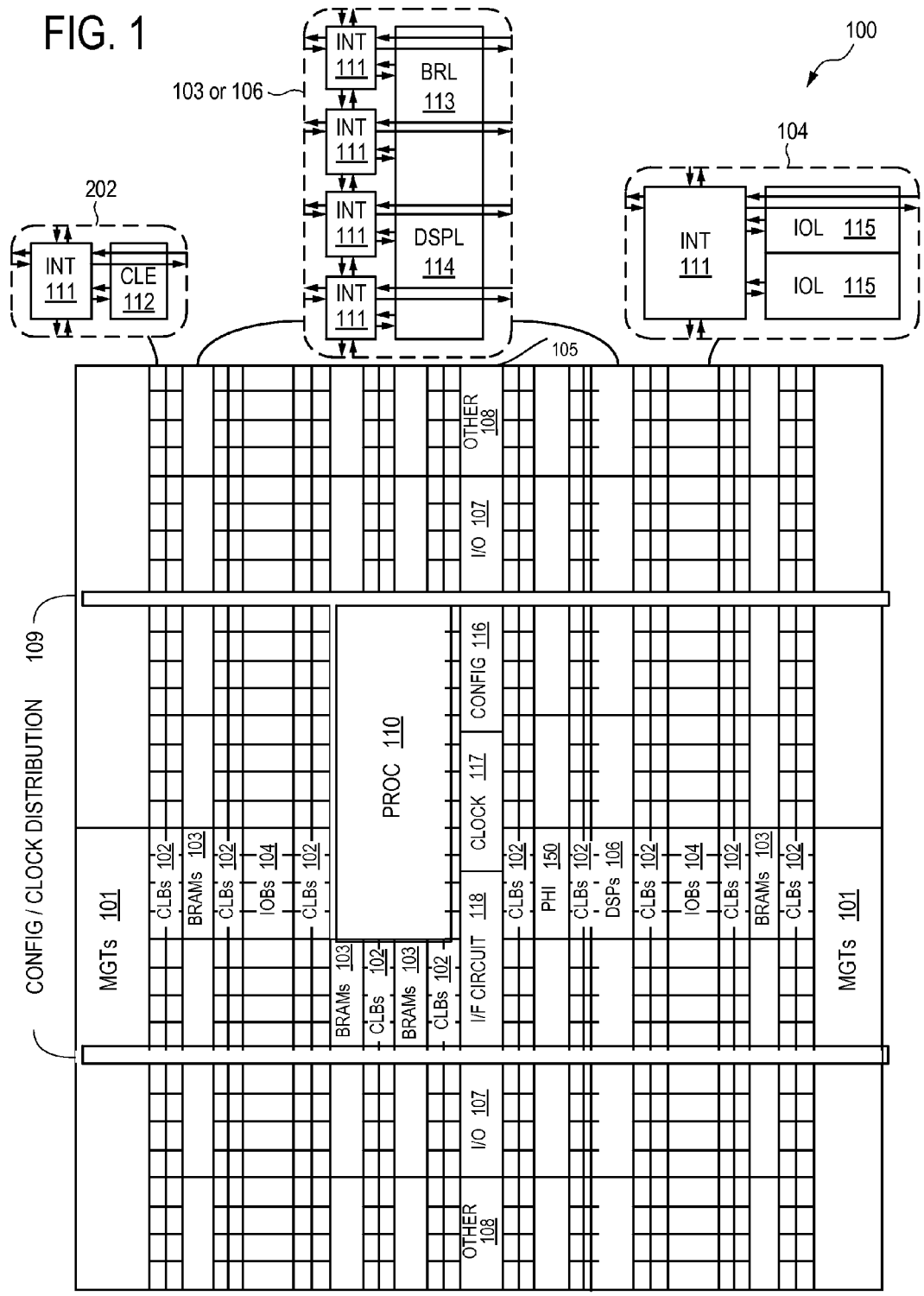
FIG. 1 illustrates an exemplary FPGA architecture.

FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. A given set of programmable tiles of an FPGA is referred to herein as a programmable fabric of the FPGA.

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

The FPGA architecture 100 also includes one or more dedicated processor blocks (PROC 110). The processor block 110 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic (e.g., CLBs, IOBs). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art. The processor block 110 is coupled to the programmable logic of the FPGA in a well known manner.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. In other embodiments, the configuration logic may be located in different areas of the FPGA die, such as in the corners of the FPGA die. Configuration information for the programmable logic is stored in configuration memory. The configuration logic 105 provides an interface to, and loads configuration data to, the configuration memory. A stream of configuration data ("configuration bitstream") may be coupled to the configuration logic 105, which in turn loads the configuration memory.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations as well as the location of the blocks within the array included at the top of FIG. 1 are purely exemplary. For example, in an actual FPGA more than one adjacent column of CLBs is typically included wherever the CLBs appear, to facilitate the efficient implementation of user logic.

Figure 2:
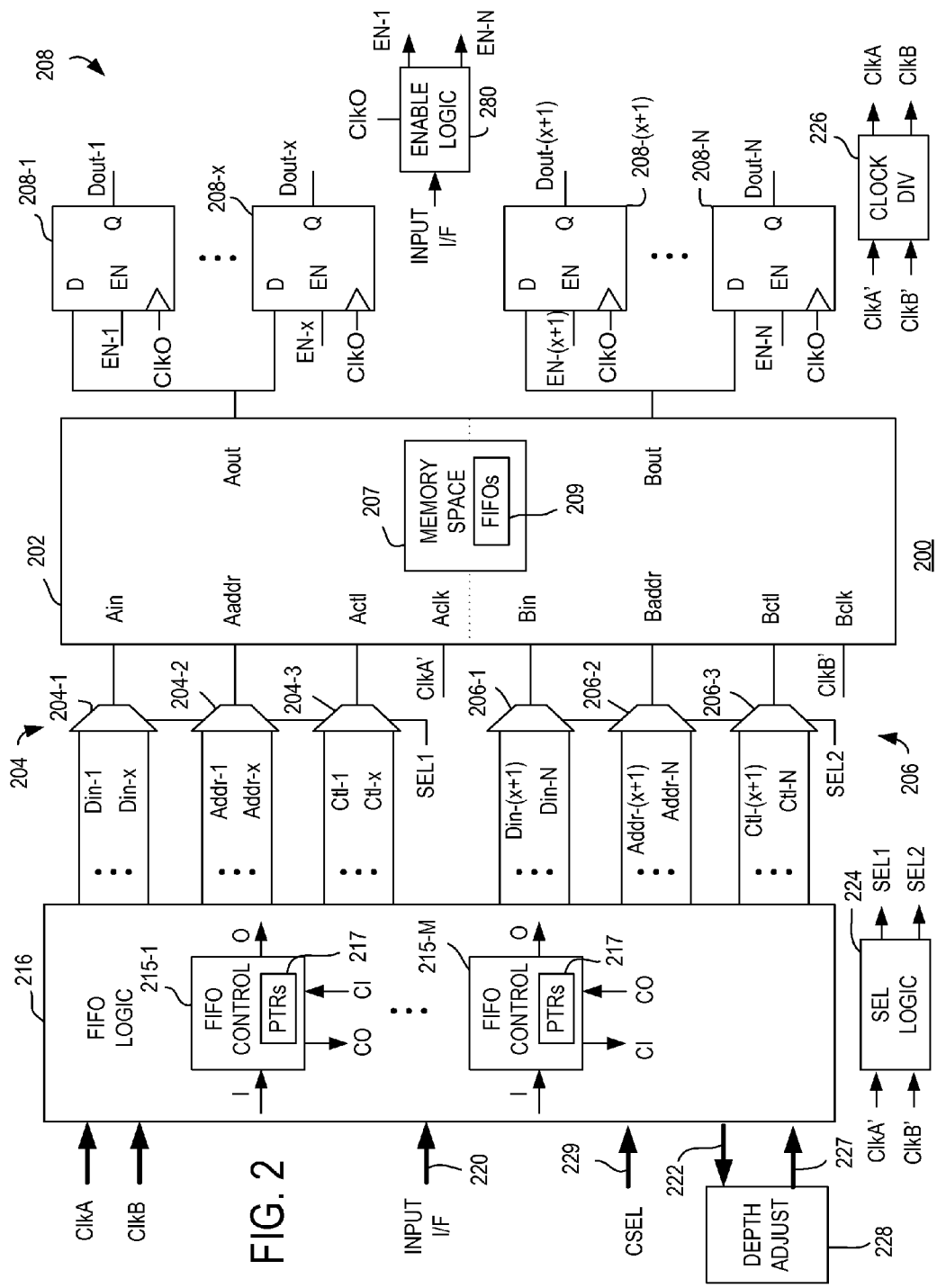
FIG. 2 is block diagram depicting an exemplary embodiment of multi first-in-first-out (FIFO) memory circuit in accordance with one or more aspects of the invention.

FIG. 2 is block diagram depicting an exemplary embodiment of multi first-in-first-out (FIFO) memory circuit 200 in accordance with one or more aspects of the invention. The FIFO memory circuit 200 can be configured in an integrated circuit, such as the FPGA 100 described above. The multi-FIFO memory circuit 200 includes FIFO logic 216 coupled to time-multiplexed BRAM logic. In some embodiments, the time-multiplexed BRAM logic includes a BRAM circuit 202, multiplexer logic 204, multiplexer logic 206, and output register logic 218. In some embodiments, the BRAM circuit 202 includes a first port (port A) and a second port (port B), which define a dual-ported memory. The ports A and B include data inputs (respectively Ain and Bin), data outputs (respectively Aout and Bout), address inputs (respectively Aaddr and Baddr), clock inputs (respectively Aclk and Bclk), and control inputs (respectively Actl and Bctl). Each control input Actl and Bctl, as shown in FIG. 2, generally represents one or more specific function control inputs, such as a clock enable input, a write enable input, and the like.

The BRAM 202 includes a memory space 207 shared between the A and B ports. A data signal coupled to Ain is stored in the memory space 207 at a location defined by an address signal coupled to Aaddr responsive to a clock signal coupled to Aclk and a control signal coupled to Actl. The term "signal" as used herein encompasses both single bit signals and multi-bit signals (e.g., a clock signal can be a single bit signal, whereas a control signal or address signal can be a multi-bit signal). A data signal coupled to Bin is stored in the memory space 207 at a location defined by an address signal coupled to Baddr responsive to a clock signal coupled to Bclk and a control signal coupled to Bctl. Likewise, data stored in the memory space 207 at a location defined by an address signal coupled to Aaddr is provided by Aout responsive to a clock signal coupled to Aclk and a control signal coupled to Actl. Data stored in the memory space 207 at location defined by an address signal coupled to Baddr is provided by Bout responsive to a clock signal coupled to Bclk and a control signal coupled to Bctl. The BRAM circuit 202 is shown as having two ports for purposes of exposition. It is to be understood that the BRAM circuit 202 may generally have at least one port, each configured similarly to the A and B ports described above, and being responsive to a respective at least one BRAM clock signal.

The A and B ports of the BRAM circuit 202 are time-multiplexed to provide a plurality of interfaces. In particular, the FIFO memory circuit 200 is shown with N interfaces to the BRAM circuit 202 ranging from 1 to N. The multiplexing logic 204 comprises multiplexers 204-1 through 204-3, and the multiplexing logic 206 comprises multiplexers 206-1 through 206-3. Outputs of the multiplexers 204-1 through 204-3 are respectively coupled to the Ain, Aaddr, and Actl ports of the BRAM circuit 202. Outputs of the multiplexers 206-1 through 206-3 are respectively coupled to the Bin, Baddr, and Bctl ports of the BRAM circuit 202. Control ports of the multiplexers 204-1 through 204-3 are configured to receive a control signal SEL1, and control ports of the multiplexers 206-1 through 206-3 are configured to receive a control signal SEL2. It is to be understood that multiplexing logic 204 and multiplexing logic 206 can each comprise a group of one or more multiplexers. In a general case, wherein the BRAM circuit 202 includes at least one port, the time multiplexed BRAM logic includes multiplexer logic having at least one group of multiplexers, one for each port of the BRAM. In the present example, the BRAM circuit 202 includes two ports A and B, and thus the time multiplexed BRAM logic includes two groups of multiplexers 204 and 206.

Each interface j, where j is between 1 and N, includes Din-j, Addr-j, and Ctl-j inputs and a Dout-j output. Inputs of the multiplexing logic 204 receive the inputs of the interfaces 1 through x, where x is between 1 and N. Inputs of the multiplexing logic 206 receive the inputs of the interfaces x+1 through N. In particular, inputs of the multiplexer 204-1 receive signals Din-1 through Din-x; inputs of the multiplexer 204-2 receive signals Addr-1 through Addr-x; and inputs of the multiplexer 204-3 receive signals Ctl-1 through Ctl-x. Inputs of the multiplexer 206-1 receive signals Din-(x+1) through Din-N; inputs of the multiplexer 206-2 receive signals Addr-(x+1) through Addr-N; and inputs of the multiplexer 206-3 receive signals Ctl-(x+1) through Ctl-N.

In operation, the multiplexer logic 204 selectively couples interfaces 1 through x to the port A of the BRAM circuit 202 responsive to SEL1. The interfaces 1 through x may be presented to the multiplexer logic 204 in accordance with a clock signal, designated clkA. The Aclk input of the BRAM 202 is configured to receive a clock signal that has a frequency at least x times faster than the clock signal clkA (designated clkA'). That is, since x interfaces are being multiplexed on the port A of the BRAM 202, the port A must be clocked at least x times faster than the clock driving the interfaces. This ensures that the x interfaces can each access the BRAM circuit 202 within one cycle of the clock signal clkA. Clock divider logic 226 can be provided to produce clkA from clkA'. It is to be understood that the clock divider logic 226 is general in that it can divide clkA' to produce clkA or can multiply clkA to produce clkA'. The SEL1 signal can be produced by selection logic 224. The selection logic 224 can produce the necessary control words on each cycle of the clock signal clkA' to cause the multiplexing logic 204 to select each of the interfaces 1 through x in one cycle of the clock clkA. For example, the selection logic 224 may comprise a looping counter responsive to the clock clkA'.

The multiplexer logic 206 selectively couples interfaces x+1 through N to the port B of the BRAM circuit 202 responsive to SEL2. The interfaces x+1 through N may be presented to the multiplexer logic 206 in accordance with a clock signal, designated clkB. The Bclk input of the BRAM 202 is configured to receive a clock signal that has a frequency at least (N-x) times faster than the clock signal clkB (designated clkB'). That is, since (N-x) interfaces are being multiplexed on the port B of the BRAM 202, the port B must be clocked at least (N-x) times faster than the clock driving the interfaces. This ensures that the (N-x) interfaces can each access the BRAM circuit 202 within one cycle of the clock signal clkB. The clock divider logic 226 can produce clkB from clkB'. The SEL2 signal can be produced by the selection logic 224. The selection logic 224 can produce the necessary control words on each cycle of the clock signal clkB' to cause the multiplexing logic 206 to select each of the interfaces x+1 through N in one cycle of the clock clkB. For example, the selection logic 224 may comprise a looping counter responsive to the clock clkB'.

The time-multiplexed interfaces to the BRAM circuit 202 can be used to implement a plurality of FIFOs 209 in the memory space 207. The FIFO logic 216 is configured to implement and control the FIFOs 209 using the N time-multiplexed interfaces to the BRAM circuit 202. Accordingly, the N interfaces described above may be referred to herein as output interfaces of the FIFO logic 216.

To implement the FIFOs 209, the FIFO logic 216 may include a plurality of FIFO control circuits 215. In the present example, FIFO control circuits 215-1 through 215-M are shown, where M is an integer greater than one. Each FIFO control circuit 215 may control a respective one of the plurality of FIFOs 209. Accordingly, the FIFOs 209 may include M FIFOs. Each of the FIFO control circuits 215 includes an input (I), an output (O), a control input (CI), and a control output (CO). Each of the FIFO control circuits 215 is further configured with address pointers 217. The FIFO logic 216 may logically divide the memory space 207 into multiple address ranges, each corresponding to one of the FIFOs 209. For each of the FIFO control circuits 215, the address pointers 217 may define one such address range for one of the FIFOs 209. The pointers 217 may be set using the control input of each FIFO control circuit 215. The input of each of the FIFO control circuits 215 can receive various signals for controlling a FIFO, including data input signals, pop signals (for reading), push signals (for writing), and/or other FIFO controls signals. The output of each of the FIFO control circuits 215 is coupled to one or more of the output interfaces of the FIFO logic 216 and can provide data, address, and control responsive to the input for driving the BRAM circuit 202. The control output of each of the FIFO control circuits 215 may provide various FIFO status signals, such as full/empty, almost full/empty, and the like. Each of the FIFO control circuits 215 may be responsive to one of the clock signal clkA or clkB.

In general, the FIFO logic 216 includes an input 220 that can provide input for the FIFO control circuits 215, and an output 222 that can provide the status output from the FIFO control circuits 215. The FIFO logic 216 also receives both clock signals clkA and clkB. The FIFO logic 216 can drive the interfaces 1 through x according to the clock clkA, and the interfaces x+1 through N according to the clock clkB.

The FIFO logic 216 can use the interfaces 1 through N in different ways to implement different types and numbers of FIFOs 209. In some embodiments, the FIFOs 209 may be asynchronous FIFOs in that the clock used to read from the FIFOs can be different than the clock used to write to the FIFOs. One of the ports A and B of the BRAM circuit 202 is used for writing to the FIFOs 209, while the other of the ports A and B is used for reading from the FIFOs 209. Any number of the FIFOs 209 can be implemented asynchronously. For example, assume the port A is used for writing and the port B is used for reading. Then x of the FIFOs 209 can be written to for each cycle of the clock clkA, and (N-x) of the FIFOs 209 can be read from for each cycle of the clock clkB.

In some embodiments, each of the FIFO control circuits 215 can receive a channel select signal via the control input CI. Each FIFO control circuit 215 can then select any one of the FIFOs 209 to access in response to a channel select signal. In such embodiment, address pointer information for all of the FIFOs 209 can be passed between the FIFO control circuits 215 or be otherwise made available to the FIFO control circuits 215 by the FIFO logic 216. In some embodiments, a given FIFO control circuit 215 may be configured to access a subset of the FIFOs 209 that is less than all of the FIFOs 209. Thus, address pointer information for a particular subset of the FIFOs 209 can be passed between specific FIFO control circuits 215 or be otherwise made available to such specific FIFO control circuits 215 by the FIFO logic 216. The FIFO logic 216 may include a channel select input 229, allowing external circuitry (not shown) to provide channel select signals to the FIFO control circuits 215.

In some embodiments, the FIFOs 209 may be synchronous FIFOs in that the clock used to read from and write to the FIFOs is the same. In such an embodiment, each of the ports A and B of the BRAM circuit 202 is used to both write to and read from the FIFOs 209. Again, any number of the FIFOs 209 can be implemented synchronously. For example, x of the FIFOs 209 can be accessed through port A of the BRAM circuit 202, and (N-x) of the FIFOs 209 can be accessed through port B of the BRAM circuit 202.

As described above, a FIFO control circuit 215 can implement a FIFO in the memory space 207 by designating a range of addresses to be used for the FIFO. The size of the address range used determines the number of data items that can be stored and is referred to as the "depth" of the FIFO. In some embodiments, the FIFO logic 216 uses a predefined depth for each of the FIFOs 209. In some embodiments, the predefined depth may be programmable upon instantiation of the FIFO memory circuit 200 in an integrated circuit (e.g., through configuration data in an FPGA). In some embodiments, the depth of each of the FIFOs 209 may be dynamically controlled during run-time. In such an embodiment, the depth adjustment logic 228 can be provided. The depth adjustment logic 228 is coupled to the output interface 222 of the FIFO logic 216. The FIFO logic 216 includes a control input 227. The depth adjustment logic 228 can establish the depth of each of the FIFOs 209 dynamically and communicate the established depths to the FIFO logic 216 via the control input 227 (e.g., to each of the FIFO control circuits 215). The control logic 228 can dynamically establish the depths of the FIFOs 209 based on status signals received from the output interface 222 of the FIFO logic 216. For example, if a given FIFO is indicated as being full or almost full, then the depth adjustment logic 228 can dynamically adjust the depth of the FIFO to provide more storage space if such additional storage space is available. The depth adjustment logic 228 can dynamically adjust another unused or less used FIFO in order to obtain additional storage space.

The outputs of the port A and/or the port B of the BRAM circuit 202 may be de-multiplexed using sets of registers responsive to enable signals. For example, the output port Aout may be coupled to inputs of registers 208-1 through 208-x. The output port Bout may be coupled to inputs of registers 208-(x+1) through 208-N, respectively. Outputs of the registers 208-1 through 208-x provide data outputs Dout-1 through Dout-x, respectively. Outputs of the registers 208-(x+1) through 208-N provide the data outputs Dout-(x+1) through Dout-N, respectively. Enable logic 280 can be provided. The enable logic 280 can produce enable signals EN-1 through EN-N, which are respectively coupled to the enable ports of the output registers 208. The enable logic 280 can generate the enable signals based on one or more signals of the input interface of the FIFO logic 216. For example, the enable logic 216 can generate the enable signals based on pop control signals for the FIFO control circuits 215. The pop signals can indicate which of the FIFOs 209 is/are being read and thus which of the output registers 208 should be enabled to store the retrieved value(s). The enable logic can generate the enable signals responsive to an output clock designated clkO. The output clock clkO is also coupled to the clock ports of the output registers 208.

The multi FIFO memory circuit 200 can be implemented in an integrated circuit, such as the FPGA 100 shown in FIG. 1. For example, the BRAM circuit 202 can comprise a BRAM 103 in the FPGA 100. Each of the multiplexing logic 204, the multiplexing logic 206, and the FIFO logic 216 can comprise dedicated logic in the FPGA 100, or may be implemented using programmable logic.

Figure 3:
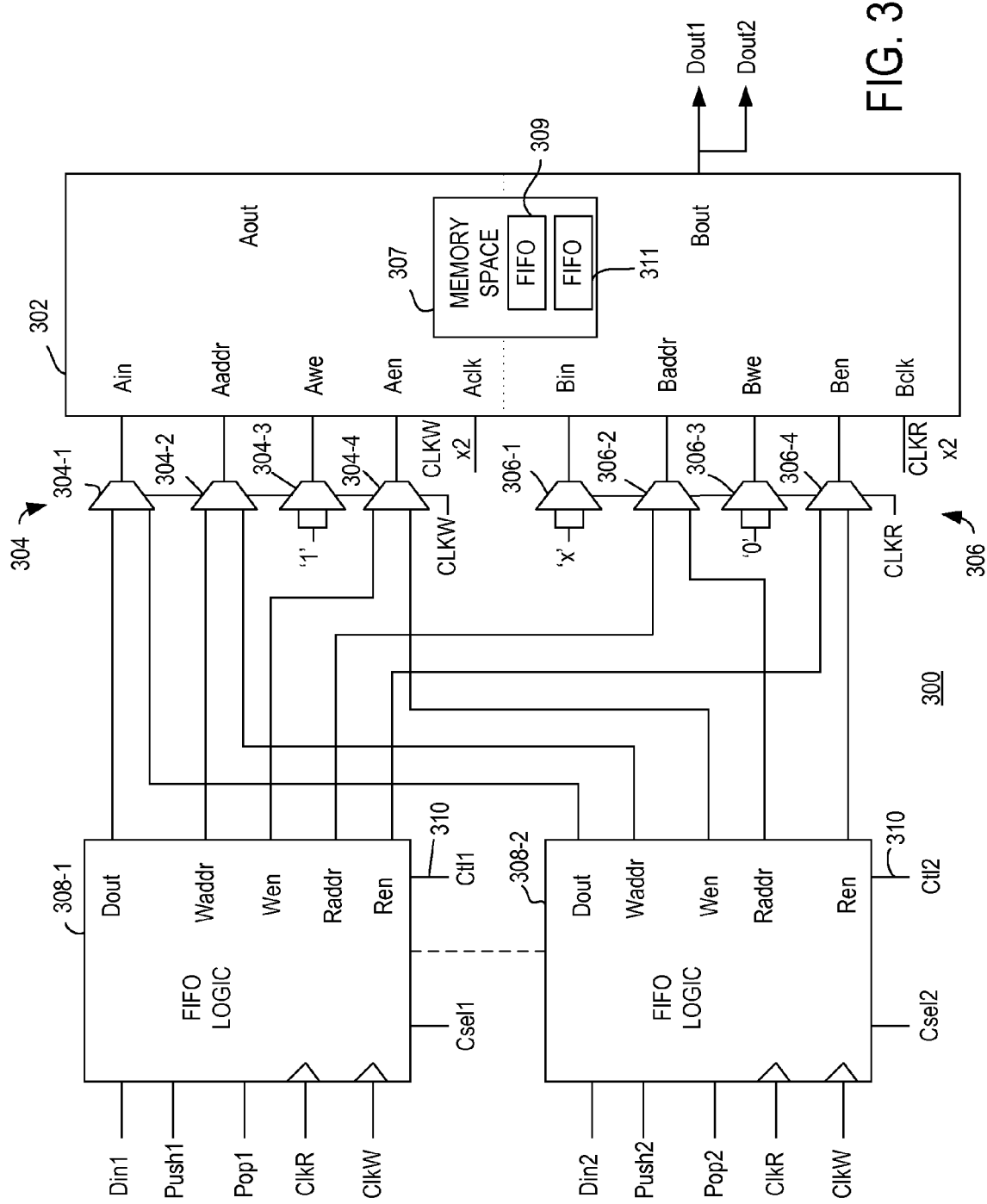
FIG. 3 is a block diagram depicting an exemplary embodiment of a dual FIFO memory in accordance with one or more aspects of the invention.

FIG. 3 is a block diagram depicting an exemplary embodiment of a dual FIFO memory 300 in accordance with one or more aspects of the invention. The dual FIFO memory 300 is an embodiment of the multi-FIFO memory 200 described above. In such embodiment, M=2 (e.g., two FIFOs and two FIFO control circuits) and N=4 (four interfaces to the BRAM).

The dual FIFO memory 300 includes a BRAM circuit 302, multiplexing logic 304, and multiplexing logic 306 (similar to the BRAM circuit 202, the multiplexing logic 204, and the multiplexing logic 206 described above). In the present example, additional detail of the time-multiplexed BRAM logic is shown. That is, the multiplexing logic 304 includes multiplexers 304-1 through 304-4, and the multiplexing logic 306 includes multiplexers 306-1 through 306-4. The control ports of the A and B interfaces of the BRAM circuit 302 include an enable port (respectively Aen and Ben) and a write enable port (respectively Awe and Bwe). The A and B interfaces also include the data in (respectively Ain and Bin), data out (respectively Aout and Bout), address (respectively Aaddr and Baddr), and clock ports (respectively Aclk and Bclk), as described above. A clock enable signal controls whether the respective port is responsive to a clock signal on its clock input. A write enable signal controls whether the respective port is responsive to a data signal on its data input. The BRAM circuit 302 includes a memory space 307 shared between the A and B interfaces.

The dual FIFO memory 300 also includes FIFO control circuit 308-1 and FIFO control circuit 308-2 (collectively FIFO logic 308). The FIFO logic 308 is configured to control the BRAM circuit 302 to implement a pair of FIFO memories, referred to as a first FIFO (FIFO 309) and a second FIFO (FIFO 311). In relation to the multi-FIFO memory circuit 200 of FIG. 2, the time-multiplexed BRAM logic includes four interfaces, 1 through 4. The FIFO control circuit 308-1 utilizes interfaces 1 and 2, and FIFO control circuit 308-2 utilizes interfaces 3 and 4. In some embodiments, the FIFO control circuit 308-1 implements the FIFO 309, and the FIFO control circuit 308-2 implements the FIFO 311. Each of the FIFO control circuit 308-1 and 308-2 includes a data input (respectively Din1 and Din2), a push input (respectively Push1 and Push2), and a pop input (respectively Pop1 and Pop2). Each of the FIFO control circuit 308-1 and 308-2 further includes a data output (Dout), a write address output (Waddr), a write enable output (Wen), a read address output (Raddr), a read enable output (Ren), a read clock input (clkR), and a write clock input (clkW). The Bout port of the BRAM circuit 302 provides the output of each of the first and second FIFOs 309 and 311, designated Dout1 and Dout2. The Aclk port of the BRAM circuit 302 receives a clock signal having at least twice the frequency of the clock signal clkW (designated clkWX2), and the Bclk port of the BRAM circuit 302 receives a clock signal having at least twice the frequency of the clock signal clkR (designated clkRX2). Together, the signals Din1, Push1, Pop1, Dout1, Din2, Push2, Pop2, Dout2, clkW, clkR, clkWX2, and clkRX2 provide the external interface of the dual FIFO memory 300. Other logic (not shown) can use such external interface to utilize a pair of FIFO memories.

Inputs of the multiplexer 304-1 are coupled to the Dout ports of the FIFO control circuits 308-1 and 308-2. Inputs of the multiplexer 304-2 are coupled to the Waddr ports of the FIFO control circuits 308-1 and 308-2. Inputs of the multiplexer 304-3 are driven by a constant active logic state (designated logic '1'). Inputs of the multiplexer 304-4 are coupled to the Wen ports of the FIFO control circuits 308-1 and 308-2. Outputs of the multiplexers 304-1 through 304-4 are respectively coupled to the Ain, Aaddr, Awe, and Aen ports of the BRAM circuit 302. Control ports of the multiplexers 304-1 through 304-4 are configured to receive the clock signal clkW.

Inputs of the multiplexer 306-1 are driven by any logic state (i.e., a "don't care" state designated 'x'). Inputs of the multiplexer 306-2 are coupled to the Raddr ports of the FIFO control circuits 308-1 and 308-2. Inputs of the multiplexer 306-3 are driven by a constant inactive logic state (designated logic '0'). Inputs of the multiplexer 306-4 are coupled to the Ren ports of the FIFO control circuits 308-1 and 308-2. Outputs of the multiplexers 306-1 through 306-4 are respectively coupled to the Bin, Baddr, Bwe, and Ben ports of the BRAM circuit 302. Control ports of the multiplexers 306-1 through 306-4 are configured to receive the clock signal clkR.

In operation, the dual FIFO memory 300 includes a common clock that controls writing to the dual FIFOs (clkW) and a common clock for reading from the dual FIFOs (clkR). The A interface of the BRAM circuit 302 provides a write interface for each of the FIFOs 309 and 311, and the B interface of the BRAM circuit 302 provides a read interface for each of the FIFOs 309 and 311. The multiplexers 304-1 through 304-4 allow the FIFO control circuits 308-1 and 308-2 to share the interface A for writing to the FIFOs 309 and 311. The multiplexers 306-1 through 306-4 allow the FIFO control circuits 308-1 and 308-2 to share the interface B for reading from the FIFOs 308 and 311. Selection logic for driving the control ports of the multiplexers 304 and 306 can be omitted, as each of the multiplexers only selects between two inputs allowing for use of a single clock signal as a control signal.

For example, the FIFO control circuit 308-1 can write to the FIFO 309 on the positive edge of the write clock clkW, and the FIFO control circuit 308-2 can write to the FIFO 311 on the negative edge of the write clock clkW. The push signals Push1 and Push2 control when the FIFO control circuit 308-1 and the FIFO control circuit 308-2 write to the FIFOs 309 and 311. The data to be written is provided by the data input signals Din1 and Din2. The data to be pushed is provided by the FIFO control circuits 308-1 and 308-2 via the Dout ports and is received by the BRAM circuit 302 at the Ain port. The FIFO control circuits 308-1 and 308-2 each establish and address space in the memory array 307 for the FIFOs 309 and 311, respectively. To push data, the FIFO control circuits 308-1 and 308-2 provide write address signals via the Waddr ports, which are received by the BRAM circuit 302 at the Aaddr port. The write enable (Awe) port of the BRAM 302 is set to enable to allow writing to the A interface of the BRAM 302. To enable the A interface of the BRAM 302, the FIFO control circuits 308-1 and 308-2 provide enable signals via the Wen ports, which are received by the BRAM circuit 302 at the Aen port. The A interface of the BRAM circuit 302 is clocked at least twice the frequency as the FIFO logic 308, which allows each of the FIFO control circuits 308-1 and 308-2 to access the A interface in one clock cycle of the write clock clkW. Those skilled in the art will appreciate that the FIFO control circuit 308-1 can be configured to write on the negative edge of the clock clkW (rather than the positive edge), and the FIFO control circuit 308-2 can be configured to write on the positive edge of the clock clkW (rather than the negative edge).

The FIFO control circuit 308-1 can read from the FIFO 309 on the positive edge of the read clock clkR, and the FIFO control circuit 308-2 can read from the FIFO 311 on the negative edge of the read clock clkR. The pop signals Pop1 and Pop2 control when the FIFO control circuit 308-1 and the FIFO control circuit 308-2 read from the FIFOs 309 and 311. The B interface of the BRAM circuit 302 is not configured for writing, and thus the write enable port (Bwe) is set to disable and the data input (Bin) is driven with a "don't care" value. As described above, the FIFO control circuits 308-1 and 308-2 each establish and address space in the memory array 307 for the FIFOs 309 and 311, respectively. To pop data, the FIFO control circuits 308-1 and 308-2 provide read address signals via the Raddr ports, which are received by the BRAM circuit 302 at the Baddr port. To enable the B interface of the BRAM 302, the FIFO control circuits 308-1 and 308-2 provide enable signals via the Ren ports, which are received by the BRAM circuit 302 at the Ben port. The B interface of the BRAM circuit 302 is clocked at least twice the frequency as the FIFO logic 308, which allows each of the FIFO control circuits 308-1 and 308-2 to access the B interface in one clock cycle of the read clock clkR. The data can be read at the data output Bout of the BRAM 302 using enabled/disabled registers, as described above in FIG. 2. Those skilled in the art will appreciate that the FIFO control circuit 308-1 can be configured to read on the negative edge of the clock clkR (rather than the positive edge), and the FIFO control circuit 308-2 can be configured to read on the positive edge of the clock clkR (rather than the negative edge).

Accordingly, the dual FIFO memory 300 is capable of providing two independent FIFO memories using a single BRAM circuit 302 in an integrated circuit, such as an FPGA (e.g., the FPGA 100 in FIG. 1). The multiplexing logic 304 and 306 can be implemented using soft resources of the integrated circuit (e.g., CLB resources) or hard resources (e.g., dedicated logic). Likewise, the FIFO logic 308 can be implemented using either soft resources or hard resources. The depths of the FIFOs 309 and 311 can be user-defined through the configuration of the FIFO logic 308. That is, each of the FIFO control circuits 308-1 and 308-2 can be configured to establish separate memory address ranges in the memory array 307 for each of the FIFOs 309 and 311. Thus, a user can define depths of the FIFOs 309 and 311 via configuration of the integrated circuit. In some embodiments, the FIFO control circuits 308-1 and 308-2 can include control inputs 310-1 and 310-2 that allow for dynamically establishing FIFO depth during run-time. Control signals CTL1 and CTL2 can be part of the external interface of the dual FIFO memory 300 and can be used to control the FIFO control circuits 308-1 and 308-2 to establish desired depths of the FIFOs 309 and 311. Alternatively, the control signals CTL1 and CTL2 can be generated by depth adjustment logic similar to the depth adjustment logic 228, described above, which dynamically adjusts FIFO depths based on status thereof.

In the embodiments above, it is assumed that the FIFO control circuit 308-1 controls the FIFO 309, and the FIFO control circuit 308-2 controls the FIFO 311. In some embodiments, the FIFO control circuits 308-1 and 308-2 each include a channel select input (respectively Csel1 and Csel2). The channel select inputs Csel1 and Csel2 allow for selection of the FIFOs 309 and 311 for writing/reading by the FIFO control circuits 308-1 and 308-2. In such an embodiment, the FIFO control circuits 308-1 and 308-2 are either configured with or otherwise communicate address information that defines the address spaces of the FIFOs 309 and 311. In this manner, each of the FIFO control circuits 308-1 and 308-2 is aware of the address space for each of the FIFOs 309 and 311. The FIFO control circuit 308-1 will write/read to/from either the FIFO1 309 or the FIFO2 311 based on the control signal Csel1. Likewise, The FIFO control circuit 308-2 will write/read to/from either the FIFO 309 or the FIFO 311 based on the control signal Csel2. This allows for FIFO selection and input data steering without any additional logic for the demultiplexing operation.

The FIFO logic 308 may comprise various logic elements, such as combinatorial logic (gates, multiplexers, etc.) and synchronous logic (e.g., flip-flops, lookup-tables, etc.), in various configurations. Those skilled in the art will understand how to construct the FIFO logic 308 using such well known logic elements based on the functional description above.

The dual-FIFO memory 300 provides two asynchronous FIFO memories. That is, each of the FIFOs 309 and 311 has a read clock and a write clock, allowing the FIFOs 309 and 311 to be read independently from being written. In some embodiments, the dual FIFO memory 300 may be modified to provide two synchronous FIFO memories, i.e., one FIFO memory operates (both read and write) using one clock, and the other FIFO memory operates (both read and write) using another clock.

Figure 4:
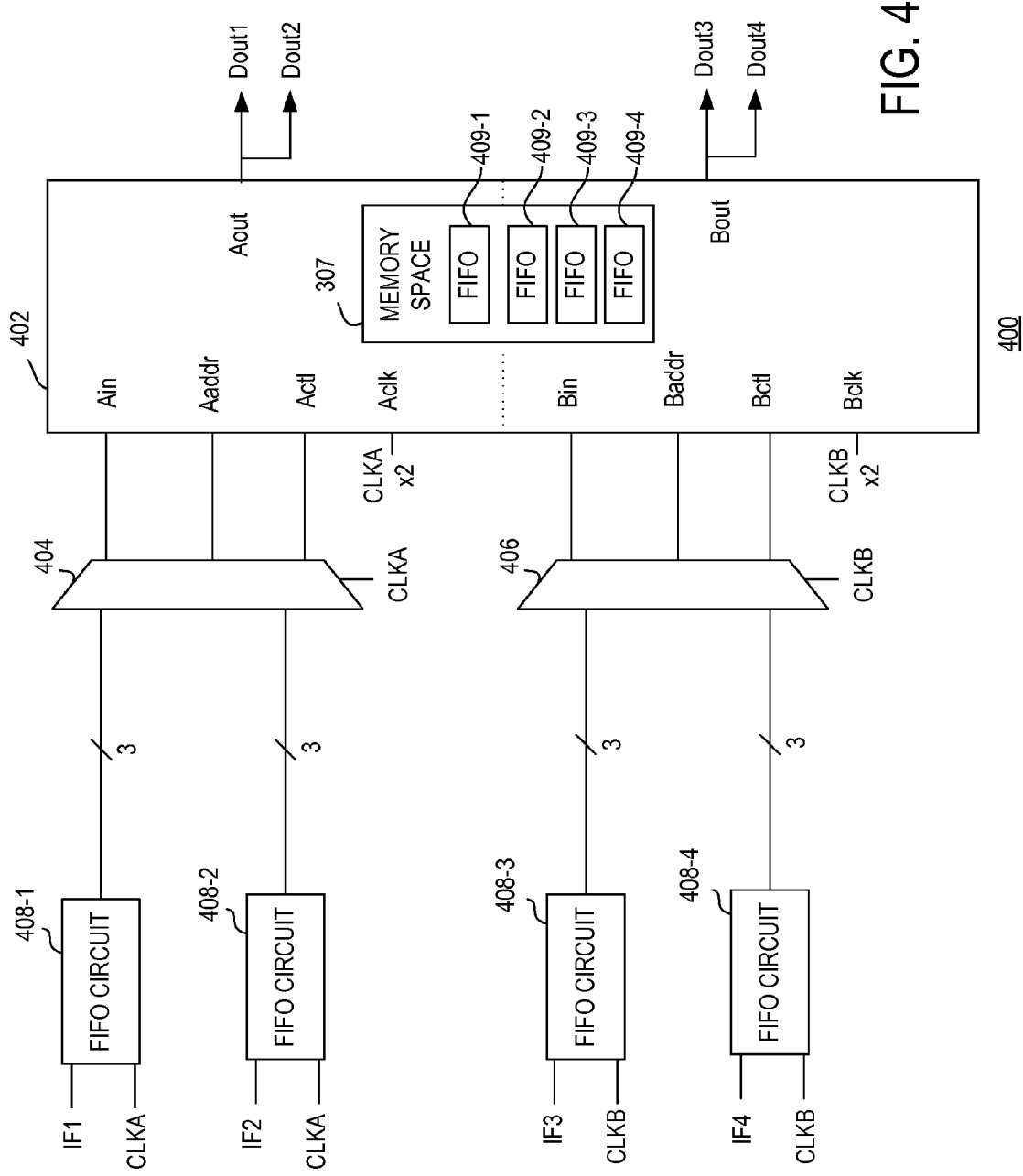
FIG. 4 is a block diagram depicting another exemplary embodiment of a dual FIFO memory in accordance with one or more aspects of the invention.

FIG. 4 is a block diagram depicting an exemplary embodiment of a dual FIFO memory 400 in accordance with one or more aspects of the invention. The dual FIFO memory 400 is an embodiment of the multi-FIFO memory 200 described above. In such embodiment, M=4 (e.g., four FIFOs and four FIFO control circuits) and N=4 (four interfaces to the BRAM). Channel selectivity and FIFO depth control have been omitted from FIG. 4, but those skilled in the art will appreciate that the dual FIFO memory 400 may include such features substantially as described above with respect to FIGS. 2 and 3.

The dual FIFO memory 400 includes four synchronous FIFOs. The dual FIFO memory 400 includes a BRAM circuit 402, multiplexing logic 404, multiplexing logic 406, and FIFO control circuits 408-1 through 408-4. The BRAM circuit 402 includes a memory space 407 shared between an interface A (Ain, Aout, Aaddr, Actl, and Aclk) and an interface B (Bin, Bout, Baddr, Bctl, and Bclk). Outputs of the multiplexing logic 404 are coupled to the Ain, Aaddr, and Actl ports of the BRAM circuit 402. Outputs of the multiplexing logic 406 are coupled to the Bin, Baddr, Bctl, and Bclk ports of the BRAM circuit 402. A control port of the multiplexing logic 404 receives a clock signal clkA, and a control port of the multiplexer 406 receives a clock signal clkB.

Each of the FIFO control circuits 408-1 and 408-2 include a set of outputs coupled to inputs of the multiplexing logic 404. Each of the FIFO control circuits 408-3 and 408-4 include a set of outputs coupled to inputs of the multiplexing logic 406. Each set of outputs of the FIFO control circuits 408-1 and 408-2 coupled to the inputs of the multiplexing logic 404 includes signals for the Ain, Aaddr, and Actl ports of the BRAM 402. The multiplexing logic 404 selects between the set of outputs from the FIFO control circuit 408-1 and the set of outputs from the FIFO control circuit 408-2 in response to the clock signal clkA. Each set of outputs of the FIFO control circuits 408-3 and 408-4 coupled to the inputs of the multiplexing logic 406 includes signals for the Bin, Baddr, and Bctl ports of the BRAM 402. The multiplexing logic 406 selects between the set of outputs from the FIFO control 408-3 and the set of outputs from the FIFO control circuit 408-4 in response to the clock signal clkB. The FIFO control circuits 408-1 through 408-4 include input interfaces IF1 through IF4, respectively. Input interfaces IF1-IF4 include data in, push, pop, and like type signals. Each of the FIFO control circuits 408-1 and 408-2 is responsive to the clock signals clkA, while each of the FIFO control circuits 408-3 and 408-4 is responsive to the clock signal clkB.

In operation, the interface A provides a read/write interface for FIFOs 409-1 and 409-2, and the interface B provides a read/write interface for FIFOs 409-3 and 409-4. As such, each of the FIFOs 409-1 and 409-2 is a synchronous FIFO based on the clock clkA, and each of the FIFOs 409-3 and 409-4 is a synchronous FIFO based on the clock clkB. The FIFO control circuit 408-1 can access the FIFO 409-1 on one of the positive or negative edge of the clock clkA, and the FIFO control circuit 408-2 can access the FIFO 409-2 on the other of the positive or negative edge of the clock clkA. Likewise, the FIFO control circuit 408-3 can access the FIFO 409-3 on one of the positive or negative edge of the clock clkB, and the FIFO control circuit 408-4 can access the FIFO 409-4 on the other of the positive or negative edge of the clock clkB. Accordingly, the interfaces IF1 and IF2 can be used to access the FIFOs 409-1 and 409-2 on both the positive and negative edges of the clock clkA, respectively. The interfaces IF3 and IF4 can be used to access the FIFOs 409-3 and 409-4 on both the positive and negative edges of the clock clkB, respectively. The output register logic has been omitted for clarity, but may be similar to that shown in FIG. 2. The signals Dout1 and Dout2 provide output of the FIFOs 409-1 and 409-2 as produced by the FIFO control circuits 408-1 and 408-2, respectively. The signals Dout3 and Dout4 provide output of the FIFOs 409-3 and 409-4 as produced by the FIFO control circuits 408-3 and 408-4, respectively.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What is claimed is:

1. Apparatus for providing first in first out (FIFO) memories in an integrated circuit, comprising:
   a block random access memory (BRAM) circuit embedded in the integrated circuit, the BRAM circuit having at least one port responsive to a respective at least one BRAM clock signal;
   FIFO logic configured to implement a plurality of FIFOs in the BRAM circuit, the FIFO logic having a plurality of output interfaces; and
   multiplexer logic configured to selectively couple the plurality of output interfaces of the FIFO logic to the at least one port of the BRAM circuit responsive to at least one FIFO clock signal, each of the at least one BRAM clock signal having at least twice the frequency of a respective one of the at least one FIFO clock signal.

2. The apparatus of claim 1, wherein the FIFO logic includes a plurality of FIFO control circuits respectively controlling the plurality of FIFOs through the plurality of output interfaces.

3. The apparatus of claim 2, wherein the FIFO logic include a channel selection input, and wherein each of the FIFO control circuits is configured to control a selected one of the plurality of FIFOs in response to a channel selection signal on the channel selection input.

4. The apparatus of claim 1, wherein the FIFO logic is configured with address pointers in a memory space of the BRAM circuit that define depths for the plurality of FIFOs.

5. The apparatus of claim 4, wherein the FIFO logic includes a control input, and wherein the apparatus further comprises:
   depth adjustment logic, coupled to the control input, configured to control the address pointers to adjust the depths of the plurality of FIFOs.

6. The apparatus of claim 5, wherein the FIFO logic includes a control output, and wherein the depth adjustment logic is configured to control the address pointers to adjust the depths of the plurality of FIFOs dynamically responsive to FIFO status signals on the control output of the FIFO logic.

7. The apparatus of claim 1, wherein the at least one BRAM clock signal includes a first BRAM clock signal and a second BRAM clock signal, wherein the at least one port of the BRAM includes a first port responsive to the first BRAM clock signal and a second port responsive to the second BRAM clock signal, wherein the at least one FIFO clock signal includes a first FIFO clock signal and a second FIFO clock signal, and wherein the multiplexing logic comprises:
   first multiplexer logic configured to selectively couple a first portion of the plurality of output interfaces to the first port of the BRAM circuit responsive to the first FIFO clock signal, the first BRAM clock signal having at least twice the frequency of the first FIFO clock signal; and
   second multiplexer logic configured to selectively couple a second portion of the plurality of output interfaces to the second port of the BRAM circuit responsive to the second FIFO clock signal, the second BRAM clock signal having at least twice the frequency of the second FIFO clock signal.

8. The apparatus of claim 7, wherein the FIFO logic is configured to write to the plurality of FIFOs through the first portion of the plurality of output interfaces coupled to the first port of the BRAM circuit, and read from the plurality of FIFOs through the second portion of the plurality of output interfaces coupled to the second port of the BRAM circuit.

9. The apparatus of claim 7, wherein the FIFO logic is configured to write to and read from the plurality of FIFOs through each of the first and second portions of the plurality of output interfaces respectively coupled to the first and second ports of the BRAM circuit.

10. A method of providing first in first out (FIFO) memories in an integrated circuit, comprising:
  providing a block random access memory (BRAM) circuit embedded in the integrated circuit, the BRAM circuit having at least one port responsive to a respective at least one BRAM clock signal;
  implementing a plurality of FIFOs in the BRAM circuit using FIFO logic having a plurality of output interfaces; and
  selectively coupling the plurality of output interfaces of the FIFO logic to the at least one port of the BRAM circuit responsive to at least one FIFO clock signal, each of the at least one BRAM clock signal having at least twice the frequency of a respective one of the at least one FIFO clock signal.

11. The method of claim 10, wherein the FIFO logic includes a plurality of FIFO control circuits, and wherein the method comprises:
  respectively controlling the plurality of FIFOs through the plurality of output interfaces.

12. The method of claim 11, wherein the FIFO logic include a channel selection input, and wherein the method comprises:
  controlling a selected one of the plurality of FIFOs via each of the FIFO control circuits in response to a channel selection signal on the channel selection input.

13. The method of claim 10, wherein the FIFO logic is configured with address pointers in a memory space of the BRAM circuit that define depths for the plurality of FIFOs.

14. The method of claim 13, further comprising:
  controlling the address pointers to adjust the depths of the plurality of FIFOs responsive to FIFO status signals from the FIFO logic.

15. An integrated circuit, comprising:
  a block random access memory (BRAM) circuit having at least one port responsive to a respective at least one BRAM clock signal; and
  programmable logic, in communication with the BRAM circuit, configured as:
    first in first out (FIFO) logic configured to implement a plurality of FIFOs in the BRAM circuit, the FIFO logic having a plurality of output interfaces;
    multiplexer logic configured to selectively couple the plurality of output interfaces of the FIFO logic to the at least one port of the BRAM circuit responsive to at least one FIFO clock signal, each of the at least one BRAM clock signal having at least twice the frequency of a respective one of the at least one FIFO clock signal.

16. The integrated circuit of claim 15, wherein the FIFO logic includes a plurality of FIFO control circuits respectively controlling the plurality of FIFOs through the plurality of output interfaces.

17. The integrated circuit of claim 16, wherein the FIFO logic include a channel selection input, and wherein each of the FIFO control circuits is configured to control a selected one of the plurality of FIFOs in response to a channel selection signal on the channel selection input.

18. The integrated circuit of claim 15, wherein the FIFO logic is configured with address pointers in a memory space of the BRAM circuit that define depths for the plurality of FIFOs.

19. The integrated circuit of claim 18, wherein the FIFO logic includes a control input, and wherein the apparatus further comprises:
  depth adjustment logic, coupled to the control input, configured to control the address pointers to adjust the depths of the plurality of FIFOs.

20. The integrated circuit of claim 19, wherein the FIFO logic includes a control output, and wherein the depth adjustment logic is configured to control the address pointers to adjust the depths of the plurality of FIFOs dynamically responsive to FIFO status signals on the control output of the FIFO logic.

* * * * *